R. STOCK.
VEHICLE WHEEL.
APPLICATION FILED JAN. 15, 1920.

1,395,615.

Patented Nov. 1, 1921.
2 SHEETS—SHEET 1.

Inventor
Robert Stock
By his Attorneys

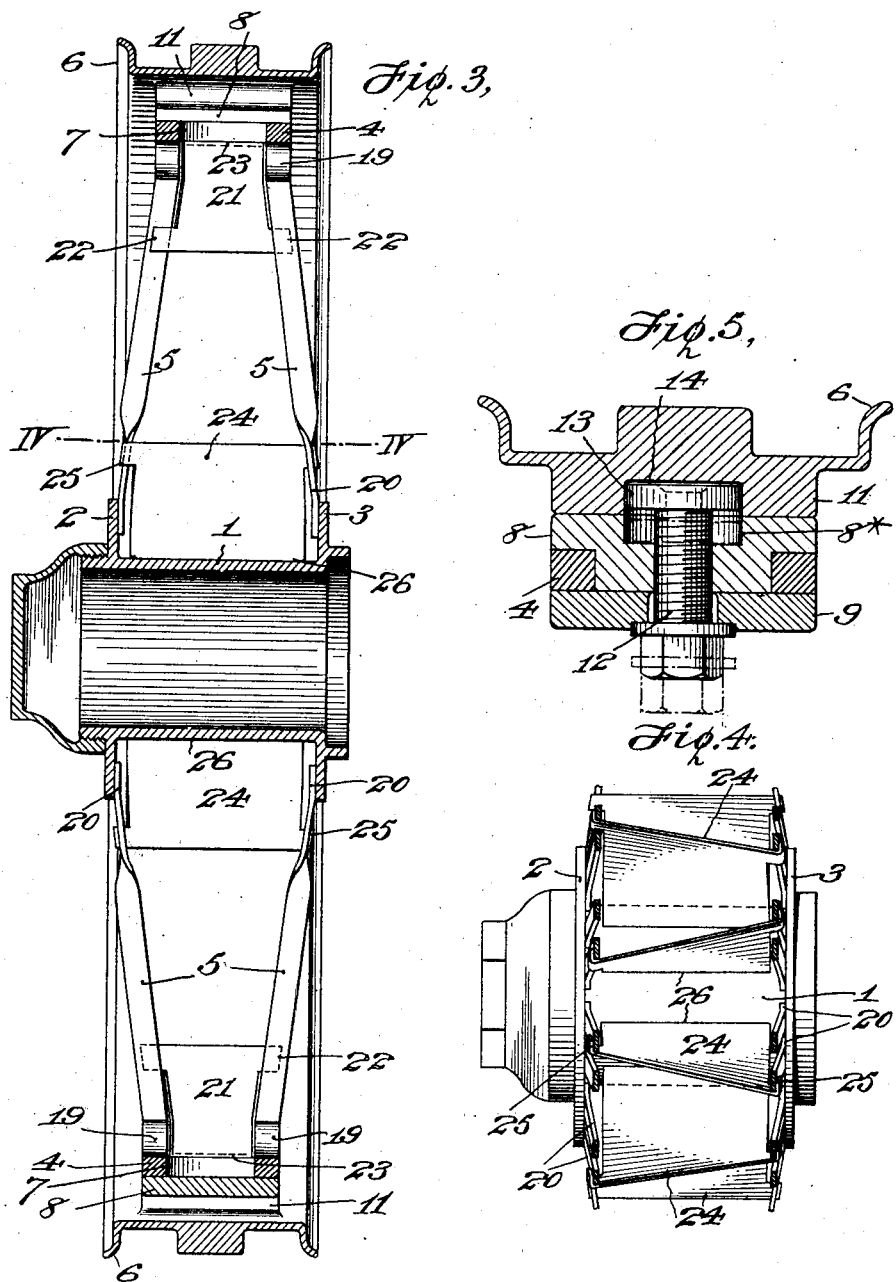

UNITED STATES PATENT OFFICE.

ROBERT STOCK, OF SANDUSKY, OHIO.

VEHICLE-WHEEL.

1,395,615.         Specification of Letters Patent.         Patented Nov. 1, 1921.

Application filed January 15, 1920. Serial No. 351,593.

*To all whom it may concern:*

Be it known that I, ROBERT STOCK, a citizen of the United States, and resident of the city of Sandusky, in the county of Erie and State of Ohio, have invented a new and useful Improvement in Vehicle-Wheels, of which the following is a specification.

This invention relates to improvements in vehicle wheels with the object in view of providing a structure of metal which is strong, durable and economical to manufacture.

Another object is to provide a vehicle wheel having a felly provided with ventilating slots and spacers whereby the tire rim may be spaced from the felly, to allow air to pass outwardly through the ventilating slots to the rim.

Another object is to provide a vehicle wheel having resilient bifurcated spokes connecting the hub and felly.

Another object is to provide spokes having fan blades attached thereto, whereby the rotation of the wheel will cause the fans to force air outwardly through the ventilating slots to the tire rim.

A still further object is to provide certain improvements in the form, construction and arrangement of the several elements, whereby the above named and other objects may be effectively attained.

A practical embodiment of my invention is represented in the accompanying drawing, in which—

Fig. 3 represents a longitudinal section on an enlarged scale taken in the plane of the line III—III of Fig. 1.

Fig. 4 represents a detail horizontal section taken in the plane of the line IV—IV of Fig. 3, looking in the direction of the arrows, and Fig. 5 represents a detail section on a still larger scale, taken through the rim and felly and one means of locking the rim to and releasing it from the felly.

Figure 1:
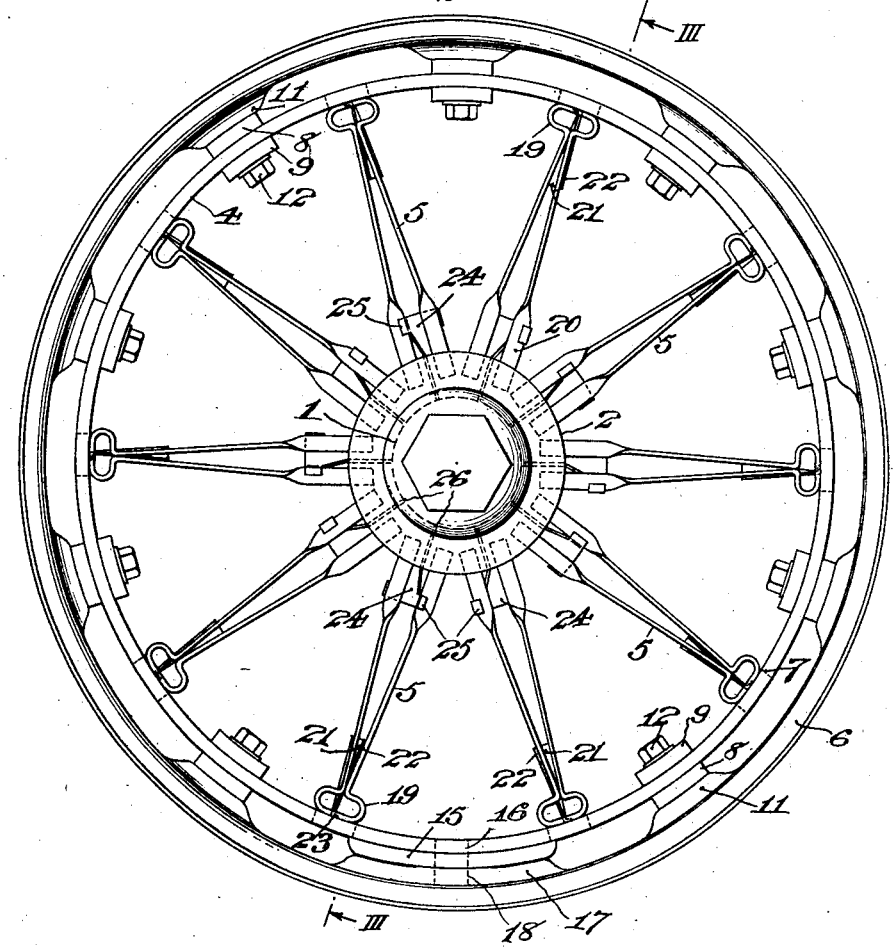
Figure 1 represents a side elevation of my improved wheel construction with a tire rim applied thereto.
Figure 2:
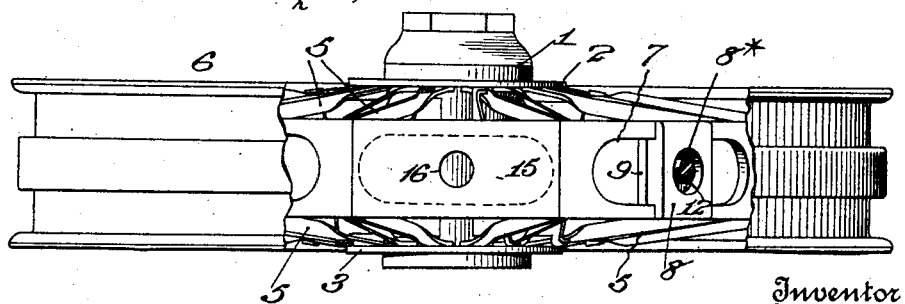
Fig. 2 represents a plan view of the same, a portion of the rim being broken away to show the felly with its ventilating slots and spacers.

The vehicle wheel consists of a hub denoted by 1 having flanges 2—3, a felly 4, spokes 5 and a rim 6. The felly 4 is formed of an annular band having ventilating slots 7, through which air may pass outwardly toward the rim and serve to keep the rim from becoming hot. Spacers 8 are interposed between the felly 4 and rim 6, each of which spacers is secured to the felly by means of a plate 9 arranged to fit within its slot and fixed to the felly by any well-known or approved manner.

The rim 6 is provided with inwardly disposed lugs 11, which coact with the spacers 8 to support the rim in position on the felly. The rim is removably secured on the spacers by means of a series of bolts 12, each having a screw threaded engagement with a spacer and adapted to be moved toward and away from the rim. Each bolt 12 is provided at its outer end with a follower 13, which is adapted to be seated in a recess 14 in the lug 11 of the rim. To remove the rim, each bolt 12 is moved inwardly, so that its follower 13 will be housed in a recess 8* in its spacer, and free of the lug 11, as shown in dotted outline in Fig. 4.

To support the valve stem of the tire (not shown) a filler piece 15 having a hole 16 is located in one of the slots in position to register with an elongated lug 17 having a hole 18, through which holes 16 and 18 the valve stem may be inserted.

The spokes 5 of the wheel are each formed of a strip of metal, preferably flat and bent to form an elongated loop 19, and twisted so that the flat portions 20 of the free ends may be secured to the hub flanges 2—3, by any well known and approved means. The spokes are arranged in pairs, so that the loop 19 of one member of a pair will be secured to one side of the felly and the flat portions 20 to one of the flanges of the hub, and the loop of the other member of the pair secured to the opposite side of the felly, while its flat portions 20 will be secured to the other flange of the hub. Thus it will be seen that by reason of the loops and the connection of the spokes with the hub and felly, a yielding movement is afforded between the hub and felly.

While I have shown and described the flat portions 20 of the spokes as being secured to the flanges 2—3 of the hub, I wish it understood that flat portions may be secured to the hub itself by any well known and approved means.

In order to create air currents while the wheel is in motion, I provide each pair of spokes with a plurality of fan blades, of which each outer blade 21 is secured between a pair of spokes by means of ears 22 and to the felly at 23. Each inner blade 24 is secured to the spokes by ears 25 and to the hub at 26. The blades 21 and 24 on each pair of spokes are arranged obliquely to the axis of rotation of the wheel, and the inclination of the blades are oppositely disposed with respect to the adjacent pair of blades.

It is obvious that various changes may be resorted to in the form, construction and arrangement of the several elements without departing from the spirit and scope of my invention; hence I do not intend to be limited to the structure herein shown and described, except as set forth in the appended claims.

What I claim is:

1. A metal vehicle wheel comprising a hub, a felly having open ventilating slots, and spokes connecting said hub and felly.

2. A metal vehicle wheel comprising a hub, a felly having ventilating slots, and spokes forming triangles between said hub and felly, said slots being located in close proximity to the spokes.

3. A metal vehicle wheel comprising a hub, a felly having ventilating slots, and spokes connecting said hub and felly, each of said spokes forming a triangle between the hub and felly.

4. A metal vehicle wheel comprising a hub, a felly having ventilating slots, spokes connecting said hub and felly, a tire rim spaced from the felly, and means for locking said rim to and releasing it from the felly.

5. A metal vehicle wheel comprising a hub, a felly having ventilating slots, spokes connecting said hub and felly, a tire rim spaced from the felly, and means carried by the felly between the spokes for locking said rim to and releasing it from the felly.

6. A metal vehicle wheel comprising a hub, a felly having ventilating slots and spacers, spokes connecting said hub and felly, a tire rim seated on said spacers, and means carried by the felly for locking said rim to and releasing it from the felly.

7. A metal vehicle wheel comprising a hub, a felly having ventilating slots and spacers, spokes connecting said hub and felly, a tire rim seated on said spacers, and means carried by certain of the spacers for locking said rim to and releasing it from the felly.

8. A metal vehicle wheel comprising a hub, a felly having ventilating slots and spacers, spokes connecting said hub and felly, and a tire rim provided with lugs arranged to coact with the spacers on the felly to support the rim.

9. A metal vehicle wheel comprising a hub, a felly having ventilating slots and spacers, spokes connecting said hub and felly, a tire rim provided with lugs arranged to coact with the spacers on the felly to support the rim, and means carried by certain of the spacers for locking the rim to and releasing it from the felly.

10. A metal vehicle wheel comprising a hub, a felly having ventilating slots and spacers, spokes connecting said hub and felly, a tire rim provided with lugs arranged to coact with the spacers on the felly to support the rim, and means movable toward and away from the rim for locking the rim to and releasing it from the felly.

11. A metal vehicle wheel comprising a hub, a felly having ventilating slots and spacers, spokes connecting said hub and felly, a tire rim provided with lugs arranged to coact with the spacers on the felly to support the rim, and means movable toward and away from the rim for locking the rim to and releasing it from the felly, said means being carried by certain of the spacers.

12. A metal vehicle wheel comprising a hub, a felly having ventilating slots, and bifurcated spokes, one end of said spokes being connected to the hub and the other end to the felly.

13. A metal vehicle wheel comprising a hub, a felly, bifurcated spokes connecting said hub and felly, each of said spokes having a loop to form a yielding connection between the hub and felly.

14. A metal vehicle wheel comprising a hub, a felly having ventilating slots, bifurcated spokes connecting said hub and felly, each of said spokes having a loop at its outer end to form a yielding connection between the hub and felly, said loops being located in close proximity to said slots.

15. A metal vehicle wheel comprising a hub, a felly having ventilating slots, bifurcated spokes connecting said hub and felly, each of said spokes having an elongated loop to form a yielding connection between the hub and felly, said loops being located in close proximity to said slots.

16. A metal vehicle wheel comprising a hub, a felly having ventilating slots, bifurcated spokes connecting said hub and felly, each of said spokes having an elongated loop at its outer end to form a yielding connection between the hub and felly, said loops being located in close proximity to said slots.

17. A metal vehicle wheel comprising a hub, a felly having ventilating slots, flat metal spokes connecting said hub and felly, each of said spokes having a loop at its outer end to form a yielding connection between the hub and felly, said loops being located in close proximity to said slots.

18. A metal vehicle wheel comprising a hub, a felly, flat metal spokes connecting said hub and felly, each of said spokes having an elongated loop at its outer end to form a yielding connection between the hub and felly.

19. A metal vehicle wheel comprising a hub, a felly, bifurcated spokes mounted in pairs and connecting said hub and felly, and a fan blade secured to each pair of supports for forcing air outwardly toward the felly.

20. A metal vehicle wheel comprising a hub, a felly having ventilating slots, bifurcated spokes mounted in pairs and connecting said hub and felly, and a fan blade secured to each pair of spokes for forcing air outwardly through said ventilating slots.

21. A metal vehicle wheel comprising a hub, a felly having ventilating slots, bifurcated spokes mounted in pairs and connecting said hub and felly, and a plurality of fan blades secured to each pair of spokes for forcing air outwardly through said ventilating slots.

22. A metal vehicle wheel comprising a hub, a felly having ventilating slots, bifurcated spokes mounted in pairs and connecting said hub and felly, and a fan blade secured to each pair of spokes for forcing air outwardly through said ventilating slots, the angle of said blade being oppositely disposed with respect to the adjacent blade.

23. A metal vehicle wheel comprising a hub, a felly having ventilating slots, bifurcated spokes mounted in pairs and connecting said hub and felly, and a plurality of fan blades secured to each pair of spokes for forcing air outwardly through said ventilating slots, the angle of the blades on one spoke being oppositely disposed to the blades on the adjacent spoke.

In testimony that I claim the foregoing as my invention, I have signed my name this 12th day of January, 1920.

ROBERT STOCK.